US009660740B2

(12) United States Patent
Wang

(10) Patent No.: US 9,660,740 B2
(45) Date of Patent: May 23, 2017

(54) SIGNAL STRENGTH DISTRIBUTION ESTABLISHING METHOD AND WIRELESS POSITIONING SYSTEM

(71) Applicant: Wistron Corporation, New Taipei (TW)

(72) Inventor: Chun-Wei Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/676,838

(22) Filed: Apr. 2, 2015

(65) Prior Publication Data

US 2016/0182164 A1    Jun. 23, 2016

(30) Foreign Application Priority Data

Dec. 17, 2014 (TW) .............................. 103144139 A

(51) Int. Cl.
*H04Q 7/10* (2006.01)
*H04B 17/318* (2015.01)
(Continued)

(52) U.S. Cl.
CPC ............ *H04B 17/318* (2015.01); *H04W 4/02* (2013.01); *H04W 24/10* (2013.01); *H04W 24/08* (2013.01)

(58) Field of Classification Search
CPC ..... H04W 64/00; H04W 24/00; H04W 16/20; H04W 16/225; H04W 88/18
(Continued)

(56) References Cited

U.S. PATENT DOCUMENTS

2004/0029558 A1* 2/2004 Liu .......................... G01S 5/02
455/404.2
2005/0243936 A1* 11/2005 Agrawala ............. H04W 64/00
375/259
(Continued)

FOREIGN PATENT DOCUMENTS

CN    101282573 B    9/2011
CN    103687006 A    3/2014

OTHER PUBLICATIONS

Office action mailed on Jan. 12, 2016 for the Taiwan application No. 103144139, filing date: Dec. 17, 2014, p. 2-3 and p. 4 line 1-25.

*Primary Examiner* — Ajit Patel
*Assistant Examiner* — Julio Perez
(74) *Attorney, Agent, or Firm* — Winston Hsu; Scott Margo

(57) ABSTRACT

A signal strength distribution establishing method includes establishing a plurality of distribution functions corresponding to a plurality of base stations; measuring a plurality of signal strengths from the plurality of base stations on at least a measuring location in an area to obtain a plurality of signal strengths measured values; adjusting the plurality of distribution functions according to the plurality of signal strengths on the at least a measuring location; computing a plurality of signal strength estimated values corresponding to a plurality of locations within the area according to the plurality of adjusted distribution functions; and establishing a signal strength distribution map corresponding to the area according to the plurality of signal strength measured values and the plurality of signal strength estimated values.

12 Claims, 2 Drawing Sheets

(51) Int. Cl.
*H04W 4/02* (2009.01)
*H04W 24/10* (2009.01)
*H04W 24/08* (2009.01)

(58) Field of Classification Search
USPC .................................. 455/456.1, 456.2, 443
See application file for complete search history.

(56) References Cited

U.S. PATENT DOCUMENTS

| | | | |
|---|---|---|---|
| 2006/0119516 A1* | 6/2006 | Krumm ................ | G01C 21/206 342/451 |
| 2007/0149216 A1 | 6/2007 | Misikangas | |
| 2008/0039114 A1* | 2/2008 | Phatak .................. | G01S 5/0252 455/456.1 |
| 2013/0310093 A1* | 11/2013 | Giannakis ............. | H04W 24/02 455/501 |

\* cited by examiner

SIGNAL STRENGTH DISTRIBUTION ESTABLISHING METHOD AND WIRELESS POSITIONING SYSTEM

BACKGROUND OF THE INVENTION

1. Field of the Invention

The present invention relates to a signal strength distribution establishing method and a wireless positioning system, and more particularly, to a signal strength distribution establishing method and a wireless positioning system capable of establishing a signal strength distribution map efficiently and correctly.

2. Description of the Prior Art

Position location (PL) techniques in wireless communication systems are used to estimate locations of terminal devices. Time of Arrival (TOA), Angle of Arrival (AOA) and Received Signal Strength (RSS) are common position location techniques. Time of Arrival-based technique firstly calculates distances between each of three base stations and a target by propagation velocity multiplying propagation time of received signals estimated by the three base stations respectively, takes each of the three base stations as a center of a circle and each of the distances as a radius for drawing circles, and thereby gets the target position by a meeting point of the three circles. Angle of Arrival-based technique determines source directions of received signals estimated by two base stations respectively, takes each base station position as a start point for forming a straight line, and thereby gets the target position by a meeting point of the two straight lines. RSS-based technique obtains distances between the target and the base stations according to received signal strength measured by mobile devices, and further derive the target position.

Since an indoor environment has complex furnishing and decoration, the radio signal propagation is not line of sight (or called Non-Line of Sight, NLOS) propagation, and a multipath effect is also quite obviously. The abovementioned TOA-based and AOA-based techniques are particularly affected by the multipath effect, and thereby easily cause errors during estimating the target position. On the other hand, variation of received signal strength is easy to estimate when the target moves, and thereby RSS-based technique are more suitable for an indoor position location system than TOA-based and AOA-based techniques.

RSS-based technique requires the received signal strength measured by mobile device, in addition, RSS-based technique needs to establish a signal strength distribution map (a.k.a. radio map). According the signal strength distribution map, the distances between the target and the base stations are derived. RSS-based technique then takes each base station as a center of a circle and each of the distances as a radius for drawing circles, and thereby determines the target position. In the prior art, to obtain the signal strength distribution map, the signal strength measured values from the plurality of base stations should be measured by mobile devices on different measuring locations in an indoor environment, and compute the signal strength values on the non-measuring locations by linear interpolation. In such a situation, an accuracy of the signal strength distribution map depends on how many measuring locations are deployed to measure the signal strengths. In general, more measuring locations yield a more accurate signal strength distribution map. In practice, an amount of measuring locations is limited. On the other hand, the signal strength values on the non-measuring locations are derived by linear interpolation. Linear interpolation has advantage of low computation complexity. However, linear interpolation over simplifies the variation of signal strength between two measuring locations, causing error between the computed signal strength distribution map and the actual signal strength distribution, such that the computed signal strength distribution map does not sufficiently represent the actual signal strength distribution. Therefore, how to establish the signal strength distribution map efficiently and correctly is a significant objective in the field.

SUMMARY OF THE INVENTION

It is therefore a primary objective of the present invention to provide a signal strength distribution establishing method and a wireless positioning system, capable of establishing a signal strength distribution map efficiently and correctly.

An embodiment of the invention discloses a signal strength distribution establishing method, utilized in a wireless positioning system, the wireless positioning system comprising a plurality of base stations, the signal strength distribution establishing method comprising establishing a plurality of distribution functions corresponding to the plurality of base stations, wherein the plurality of distribution functions describe signal strength distributions of signals transmitted from the plurality of base stations; measuring a plurality of signal strengths on at least a measuring location in an area from the plurality of base stations to obtain a plurality of signal strength measured values; adjusting the plurality of distribution functions according to the plurality of signal strength measured values corresponding to the at least a measuring location; computing a plurality of signal strength estimated values corresponding to a plurality of locations within the area according to the plurality of adjusted distribution functions, wherein the plurality of locations are different from the at least a measuring location; and establishing a signal strength distribution map corresponding to the area according to the plurality of signal strength measured values and the plurality of signal strength estimated values.

An embodiment of the invention further discloses a wireless positioning system, utilized for establishing a signal strength distribution map, comprising a plurality of base stations disposed in an area; at least a mobile device capable of measuring a plurality of signal strength measured values on at least a measuring location in an area from the plurality of base stations and sending the plurality of signal strength measured values to the plurality of base stations; a coordinating device coupled to the plurality of base stations for receiving the plurality of signal strength measured values, the coordinating device configured for performing following steps: establishing a plurality of distribution functions corresponding to the plurality of base stations, wherein the plurality of distribution functions describe signal strength distributions of signals transmitted from the plurality of base stations; adjusting the plurality of distribution functions according to the plurality of signal strength measured values corresponding to the at least a measuring location; computing a plurality of signal strength estimated values corresponding to a plurality of locations within the area according to the plurality of adjusted distribution functions, wherein the plurality of locations are different from the at least a measuring location; and establishing the signal strength distribution map corresponding to the area according to the plurality of signal strength measured values and the plurality of signal strength estimated values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
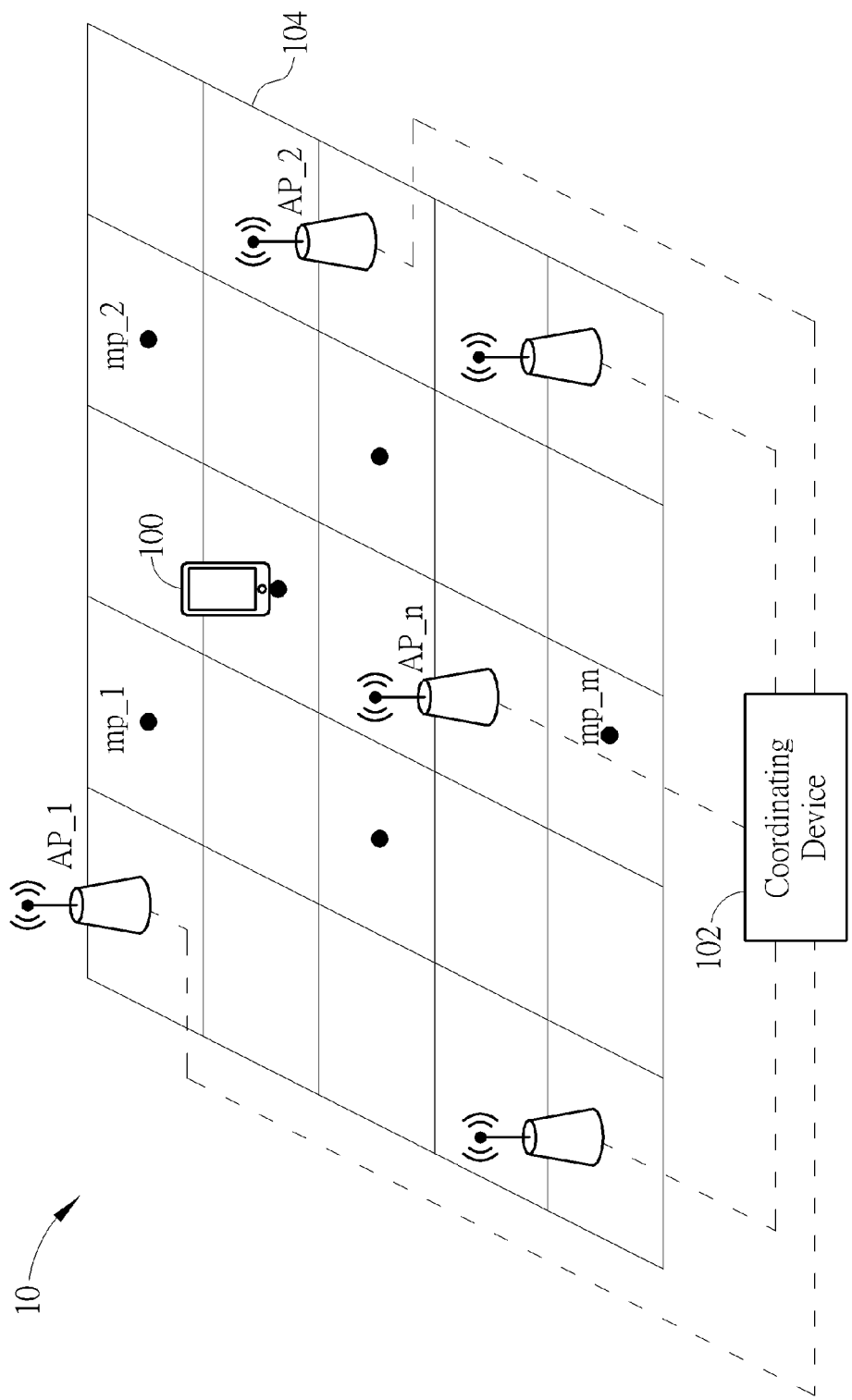
FIG. 1 is a schematic diagram of a wireless positioning system according to an embodiment of the present invention.

FIG. 1 is a schematic diagram of a wireless positioning system 10 according to an embodiment of the present invention. The wireless positioning system 10 comprises base stations AP_1-AP_n, a mobile device 100 and a coordinating device 102. The base stations AP_1-AP_n may be access points, for transmitting and receiving wireless signals. The base stations AP_1-AP_n are deployed in an area 104 such as a marketplace, a large warehouse, a library, etc. Measuring locations mp_1-$mp$_m are deployed within the area 104. The mobile device 100 may measure the wireless signals from the base stations AP_1-AP_n at the measuring locations mp_1-$mp$_m in the area 104, and send the measuring results to the coordinating device 102. The coordinating device 102 is a computer or a server with computation capability. The coordinating device 102 is coupled to the base stations AP_1-AP_n, for executing relative computation to establish a signal strength distribution map corresponding to the area 104. In addition, the coordinating device 102 may instruct the base stations AP_1-AP_n to transmit wireless signals for the mobile device 100 to perform signal strength measurement, and to receive the measuring results of the mobile device 100. The wireless positioning system 10 may determine a location of a target device within the area 104 related to the base stations AP_1-AP_n.

Figure 2:
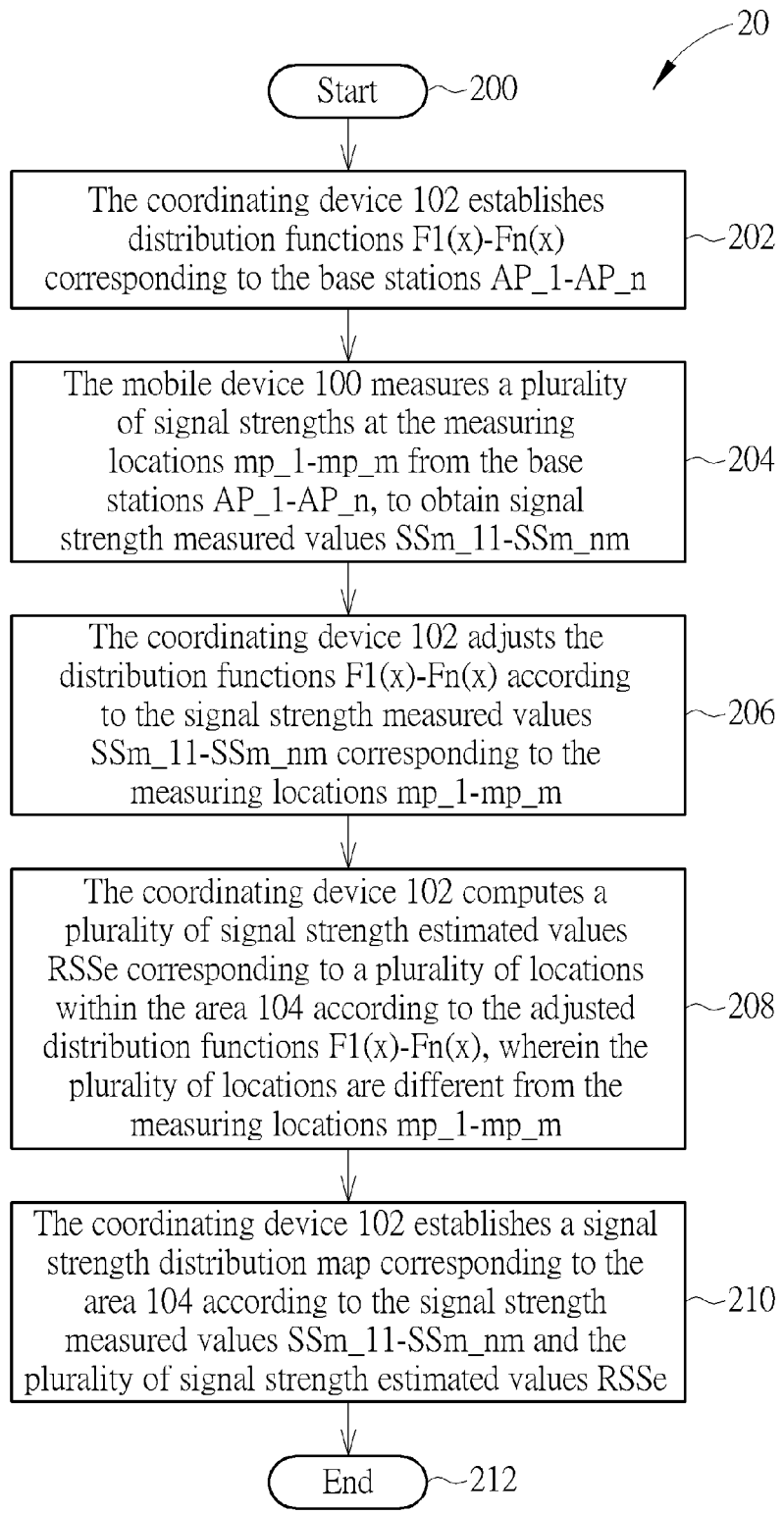
FIG. 2 is a schematic diagram of a signal strength distribution establishing process according to an embodiment of the present invention.

In detail, FIG. 2 is a schematic diagram of a signal strength distribution establishing process 20 according to an embodiment of the present invention. The process 20 is utilized for establishing the signal strength distribution map corresponding to the area 104, which may be executed by the wireless positioning system 10. As shown in FIG. 2, the process 20 comprises following steps:

Step 200: Start.

Step 202: The coordinating device 102 establishes distribution functions F1($x$)-Fn(x) corresponding to the base stations AP_1-AP_n.

Step 204: The mobile device 100 measures a plurality of signal strengths at the measuring locations mp_1-$mp$_m from the base stations AP_1-AP_n, to obtain signal strength measured values SSm_11-SSm_nm.

Step 206: The coordinating device 102 adjusts the distribution functions F1($x$)-Fn(x) according to the signal strength measured values SSm_11-SSm_nm corresponding to the measuring locations mp_1-$mp$_m.

Step 208: The coordinating device 102 computes a plurality of signal strength estimated values RSSe corresponding to a plurality of locations within the area 104 according to the adjusted distribution functions F1($x$)-Fn(x), wherein the plurality of locations are different from the measuring locations mp_1-$mp$_m.

Step 210: The coordinating device 102 establishes a signal strength distribution map corresponding to the area 104 according to the signal strength measured values SSm_11-SSm_nm and the plurality of signal strength estimated values RSSe.

Step 212: End.

Specifically, in Step 202, the coordinating device 102 establishes the distribution functions $F_1(x)$-$F_n(x)$ corresponding to the base stations AP_1-AP_n. First of all, the coordinating device 102 obtains a space arrangement map of the area 104 and location information of the base stations AP_1-AP_n. The coordinating device 102 establishes the distribution functions $F_1(x)$-$F_n(x)$ corresponding to the base stations AP_1-AP_n according to a pre-constructed signal strength distribution model, wherein x represents a location coordinate in the area 104. For example, an administrator may input the space arrangement map of the area 104 through software of the coordinating device 102, and annotate actual coordinates $c_1$-$c_n$ of the base stations AP_1-AP_n for further computation. The signal strength distribution model describes signal strength attenuation around the base station of wireless signals emitted from the base station. The distribution functions $F_1(x)$-$F_n(x)$ describe signal strength distribution (i.e. signal strength attenuation) of wireless signals emitted from the base stations $AP_n$1-AP_n. Since signal strength attenuation around the base station is related to propagation distances of the wireless signals, the coordinating device 102 may utilize a radial basis function (RBF) $\Phi(x)$ as the pre-constructed signal strength distribution model. The radial basis function (RBF) $\Phi(x)$ depends only on a distance between the location coordinate x and the origin point (base station), i.e., $\Phi(x)=\Phi(\|x\|)$, where $\|x\|$ represents the distance between the location coordinate x and the origin point. In such a situation, the distribution functions $F_1(x)$-$F_n(x)$ are radial basis functions centered at the locations of the base stations AP_1-AP_n. Specifically, the distribution functions $F_1(x)$-$F_n(x)$ are proportional to the radial basis functions centered at the locations of the base stations AP_1-AP_n. Take the distribution function $F_i(x)$ as an example, $F_i(x)=a_i\phi(\|x-c_i\|)$, where $a_i$ represents a ratio between the distribution function $F_i(x)$ and the radial basis function $\Phi(\|x-c_i\|)$. In other words, the coordinating device 102 establishes the distribution functions $F_1(x)$-$F_n(x)$ according to the actual coordinates $c_1$-$c_n$ of the base stations AP_1-AP_n and the radial basis function $\Phi(x)$.

Furthermore, in order to model the attenuation of the wireless signals in indoor space more precisely, the coordinating device 102 may utilize a thin plate spline (TPS) function $U_{TPS}(x)$ as the pre-constructed signal strength distribution model. The TPS function may be represented as $U_{TPS}(x)=\|x\|^2 \ln(\|x\|)$. In such a situation, the distribution functions $F_1(x)$-$F_n(x)$ are proportional to the TPS functions centered at the locations of the base stations AP_1-AP_n, i.e., $F_i(x)=a_i U_{TPS}(\|x-c_i\|)$, $\forall i=\{1, \ldots, n\}$.

In Step 204, the mobile device 100 measures the plurality of signal strengths on the measuring locations mp_1-$mp$_m from the base stations AP_1-AP_n, to obtain the signal strength measured values SSm_11-SSm_nm. Take the measuring location mp_k as an example, the signal strength measured values SSm_lk-SSm_nk represent the measured signal strength from the base stations AP_1-AP_n measured by the mobile device 100 at the measuring location mp_k. Specifically, after the mobile device 100 measures the signal strengths from the base stations AP_1-AP_n and obtains the signal strength measured values SSm_11-SSm_nm, the mobile device 100 may send the signal strength measured values SSm_11-SSm_nm to the coordinating device 102 directly. Alternatively, the mobile device 100 may send the signal strength measured values SSm_11-SSm_nm to the base stations AP_1-AP_n first, and then the base stations AP_1-AP_n send the signal strength measured values SSm_11-SSm_nm to the coordinating device 102. The coordinating device 102 records the signal strength measured values SSm_11-SSm_nm corresponding to the measuring locations mp_1-mp_m according to the measuring location mp_1-mp_m at which the mobile device 100 measures the signal strengths.

In Step 206, the coordinating device adjusts the distribution functions $F_1(x)$-$F_n(x)$ according to the signal strength measured values SSm_11-SSm_nm corresponding to the measuring locations mp_1-mp_m. Specifically, take the base station AP_i as an example, the coordinating device 102 adjusts the ratio $a_i$ between the distribution function $F_i(x)$ and the radial basis function $\Phi(\|x-c_i\|)$ corresponding to the base station AP_i, according to the signal strength measured values SSm_i1-SSm_im measured by the mobile device 100 at the measuring location mp_1-mp_m. The ratio $a_i$ may be derived using statistical estimation method. In other words, the coordinating device 102 may utilize least square (LS) method, minimum mean square error (MMSE) method, maximum likelihood (ML) method or other methods to obtain the ratio $a_i$, so as to adjust the distribution functions $F_1(x)$-$F_n(x)$.

In Step 208, the coordinating device 102 computes the plurality of signal strength estimated values RSSe corresponding to the plurality of locations within the area 104 according to the adjusted distribution functions $F_1(x)$-$F_n(x)$, wherein the plurality of locations are different from the measuring location mp_1-mp_m. Specifically, take a location coordinate $x_0$ which is different from the measuring locations mp_1-mp_m in the area 104 as an example, at the location coordinate $x_0$, the coordinating device 102 obtains distribution function values $F_1(x_0)$-$F_n(x_0)$ according to the adjusted distribution functions $F_1(x)$-$F_n(x)$. In addition, the coordinating device 102 generates a set of weighting coefficients $w_1$-$w_n$, for performing weighted average of the distribution function values $F_1(x_0)$-$F_n(x_0)$ corresponding to the location coordinate $x_0$ to obtain a signal strength estimated value RSSe corresponding to the location coordinate $x_0$. In other words, the signal strength estimated value RSSe corresponding to the location coordinate $x_0$ may be represented as $RSSe=\Sigma_{i=1}^{n}w_iF_i(x_0)$. Similarly, for the plurality of locations which are different from the measuring locations mp_1-mp_m within the area 104, the coordinating device 102 may obtain the distribution function values according to the adjusted distribution functions $F_1(x)$-(x), and perform weighted average to compute the plurality of signal strength estimated values RSSe corresponding to the plurality of locations.

Furthermore, (take the location coordinate $x_0$ in the area 104 as an example) the weighting coefficients $w_1$-$w_2$ represent confidence levels of the coordinating device 102 on the distribution function values $F_1(x_0)$-$F_n(x_0)$. The larger weighting coefficient $w_k$ indicates that the coordinating device 102 has more confidence on the distribution function value $F_k(x_0)$. Meanwhile, the weighting coefficients $w_1$-$w_n$ has property of $\Sigma_{i=1}^{n}w_i=1$ The weighting coefficients $w_1$-$w_2$ may be determined according to system requirements or practical situations. For example, if the coordinating device 102 determines the confidence levels on the distribution function values $F_1(x_0)$-$F_n(x_0)$ according to the signal strengths, the coordinating device 102 may choose the weighting coefficients $w_1$-$w_n$ to be proportional to the distribution function values $F_1(x_0)$-$F_n(x_0)$, i.e., $w_j=sF_j(x_0)$, $\forall j=\{1,\ldots,n\}$, where the coefficient s is chosen to satisfy $\Sigma_{i=1}^{n}=1$. In another perspective, if the coordinating device 102 determines the confidence levels on the distribution function values $F_1(x_0)$-$F_n(x_0)$ according to distances $d_1$-$d_n$ between the location coordinate $x_0$ and the base stations AP_1-AP_n, may choose the weighting coefficients $w_1$-$w_n$ to be proportional to the distances $d_1$-$d_n$ i.e., $w_j=td_j$, $\forall j=\{1,\ldots,n\}$, where the coefficient t is chosen to satisfy $\Sigma_{i=1}^{n}w_i=1$.

In Step 210, the coordinating device 102 may combine the signal strength measured values SSm_11-SSm_nm corresponding to the measuring location mp_1-mp_m and the plurality of signal strength estimated values RSSe corresponding to the plurality of locations different from the measuring locations mp_1-mp_m within the area 104, to establishes the signal strength distribution map corresponding to the area 104. Moreover, the coordinating device 102 may perform weighted average on the signal strength measured values SSm_11-SSm_nm corresponding to the measuring locations mp_1-mp_m, to obtain signal strength comprehensive values SSc_1-SSc_m corresponding to the measuring locations mp_1-mp_m. Take the measuring location mp_k as an example, the signal strength measured values SSm_1k-SSm_nk corresponding to the measuring location mp_k may be combined as a signal strength comprehensive value SSc_k corresponding to the measuring location mp_k using weighted average method. Similarly, the signal strength comprehensive values SSc_1-SSc_m corresponding to the measuring locations mp_1-mp_m are obtained. Therefore, the coordinating device 102 may combine the signal strength comprehensive values SSc_1-SSc_m corresponding to the measuring locations mp_1-mp_m and the plurality of signal strength estimated values RSSe corresponding to the plurality of locations different from the measuring locations mp_1-mp_m within the area 104, to establish the signal strength distribution map corresponding to the area 104.

Through the process 20, the wireless positioning system 10 may establish the signal strength distribution map corresponding to the area 104. Furthermore, when a target device enters the area 104 and proposes a positioning request, the wireless positioning system 10 may determine distances between the target device and the base stations AP_1-AP_n according to the established signal strength distribution map. The wireless positioning system 10 then generates circles centered at the base stations AP_1-AP_n and with radiuses as the distances between the target device and the base stations AP_1-AP_n, so as to determine the location of the target device relative to the base stations AP_1-AP_n in the area 104. According to the process 20, the wireless positioning system 10 may correctly establish the signal strength distribution map according to small amount of measuring locations, such that the amount of the measuring locations and error brought by linear interpolation between measuring locations are reduced, and correctness of the signal strength distribution map is enhanced.

In addition, a structure of the coordinating device 102 in the wireless positioning system 10 is not limited to certain specific structure. The coordinating device 102 may comprise a processor and a storage unit. The storage unit comprises a program code. The program code is utilized to instruct the processor to execute the steps in the above as establishing the distribution functions $F_1(x)$-$F_n(x)$, adjusting the distribution functions $F_1(x)$-$F_n(x)$, computing the plurality of signal strength estimated values RSSe, establishing the signal strength distribution map, etc. Moreover, the processor may be a central processing unit (CPU), digital signal processor (DSP), or an application-specific integrated circuit (ASIC). The storage unit may be, inter alia, read-only memory (ROM), random-access memory (RAM), non-volatile memory (e.g., an electrically erasable programmable read only memory (EEPROM) or a flash memory), CD-ROMs, magnetic tapes, floppy disks, optical data storage devices, etc.

Notably, the embodiments stated in the above are utilized for illustrating concepts of the present invention. Those skilled in the art may make modifications and alternations accordingly, and not limited herein. For example, the wireless positioning system may comprise a plurality of mobile devices for measuring the signal strengths from the base stations, and not limited to comprising only one mobile device. In addition, in the embodiments above, the plurality of measuring locations are deployed in the area, and not limited thereto. Deploying only one measuring location in the area is also under the scope of the present invention. The signal strength distribution model is not limited to be TPS function. Functions such as Gaussian function, multiquadric function, polyharmonic spline function, etc., or other functions built by statistical learning method corresponding to different wireless propagation environment, may also be utilized as the pre-constructed signal strength distribution model, and not limited herein.

In the prior art, an accuracy of the signal strength distribution map depends on how many measuring locations are deployed. To obtain an accurate signal strength distribution map, a larger amount of measuring locations is needed. In comparison, the signal strength distribution establishing method of the present invention utilizes the pre-constructed signal strength distribution model and requires the signal strength measured values on less measuring locations to establish the signal strength distribution map. Error brought by linear interpolation between measuring locations is also reduced.

In summary, the present invention utilizes radial basis function as the signal strength distribution model as the signal strength distribution functions around the base stations, adjusts the distribution functions according to the signal strength measured values corresponding to the measuring locations, computes the plurality of signal strength estimated values corresponding to the locations within the area according to the adjusted distribution functions, and finally combines the signal strength measured values on the measuring locations and the signal strength estimated values on the non-measuring locations, so as to establish the signal strength distribution map corresponding to the area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal strength distribution establishing method, configured to establish a signal strength distribution map of an area, utilized in a wireless positioning system, the wireless positioning system comprising a plurality of base stations, the signal strength distribution establishing method comprising:
    establishing a plurality of distribution functions corresponding to the plurality of base stations, wherein the plurality of distribution functions describe signal strength distributions of signals transmitted from the plurality of base stations, and the plurality of distribution functions is related to a pre-defined function;
    measuring a plurality of signal strengths on at least a measuring location in the area from the plurality of base stations, to obtain a plurality of signal strength measured values;
    adjusting the plurality of distribution functions according to the plurality of signal strength measured values corresponding to the at least a measuring location, so as to generate a plurality of adjusted distribution functions;
    obtaining a plurality of adjusted distribution function values corresponding to the plurality of locations according to the plurality of adjusted distribution functions;
    generating a plurality of weighting coefficients corresponding to the distribution function values; and
    computing the plurality of signal strength estimated values corresponding to the plurality of locations according to the distribution function values and the plurality of weighting coefficients, so as to establish the signal strength distribution map;
    wherein the plurality of distribution functions is unrelated to the plurality of signal strength measured values.

2. The signal strength distribution establishing method of claim 1, wherein the step of establishing the plurality of distribution functions corresponding to the plurality of base stations comprises:
    obtaining a plurality of base station location information corresponding to the plurality of base stations; and
    establishing the plurality of distribution functions corresponding to the plurality of base stations according to the plurality of base station location information and a radial basis function (RBF).

3. The signal strength distribution establishing method of claim 2, wherein the radial basis function is a thin plate spline (TPS) function.

4. The signal strength distribution establishing method of claim 2, wherein the step of adjusting the plurality of distribution functions according to the plurality of signal strength measured values corresponding to the at least a measuring location is adjusting ratios between the plurality of distribution functions and the radial basis function according to the at least a measuring location and the plurality of signal strength measured values.

5. The signal strength distribution establishing method of claim 1, wherein the plurality of weighting coefficients are related to the distribution function values.

6. The signal strength distribution establishing method of claim 1, wherein the signal strength distribution map is utilized for positioning a target device within the area related to the plurality of base stations.

7. A wireless positioning system, configured to establish a signal strength distribution map of an area, utilized for establishing a signal strength distribution map, comprising:
    a plurality of base stations disposed in an area;
    at least a mobile device capable of measuring a plurality of signal strength measured values on at least a measuring location in the area from the plurality of base stations and sending the plurality of signal strength measured values to the plurality of base stations;
    a coordinating device coupled to the plurality of base stations for receiving the plurality of signal strength measured values, the coordinating device configured for performing following steps:
        establishing a plurality of distribution functions corresponding to the plurality of base stations, wherein the plurality of distribution functions describe signal strength distributions of signals transmitted from the plurality of base stations, and the plurality of distribution functions is related to a pre-defined function;
adjusting the plurality of distribution functions according to the plurality of signal strength measured values corresponding to the at least a measuring location, so as to generate a plurality of adjusted distribution functions;
obtaining a plurality of adjusted distribution function values corresponding to the plurality of locations according to the plurality of adjusted distribution functions;
generating a plurality of weighting coefficients corresponding to the distribution function values; and
computing the plurality of signal strength estimated values corresponding to the plurality of locations according to the distribution function values and the plurality of weighting coefficients, so as to establish the signal strength distribution map;
wherein the plurality of distribution functions is unrelated to the plurality of signal strength measured values.

8. The wireless positioning system of claim 7, wherein the coordinating device is further configured for performing following steps for establishing a plurality of distribution functions corresponding to a plurality of base stations:

obtaining a plurality of base station location information corresponding to the plurality of base stations; and
establishing the plurality of distribution functions corresponding to the plurality of base stations according to the plurality of base station location information and a radial basis function (RBF).

9. The wireless positioning system of claim 8, wherein the radial basis function is a thin plate spline (TPS) function.

10. The wireless positioning system of claim 8, wherein the step of adjusting the plurality of distribution functions according to the plurality of signal strength measured values corresponding to the at least a measuring location is adjusting ratios between the plurality of distribution functions and the radial basis function according to the at least a measuring location and the plurality of signal strength measured values.

11. The wireless positioning system of claim 7, wherein the plurality of weighting coefficients are related to the distribution function values.

12. The wireless positioning system of claim 7, wherein the signal strength distribution map is utilized for positioning a target device within the area related to the plurality of base stations.

* * * * *